Jan. 13, 1959 R. POPPA ET AL 2,868,967

REMOTE CONTROL TUNER

Filed June 15, 1956 5 Sheets-Sheet 1

INVENTORS
ROCCO POPPA
JOHN L. HOELLERICH
BY J. D. Douglas
THEIR ATTORNEY

INVENTORS
ROCCO POPPA
JOHN L. HOELLERICH
BY
J. D. Douglas
THEIR ATTORNEY

INVENTORS
ROCCO POPPA
JOHN L. HOELLERICH
BY
J. D. Douglas
THEIR ATTORNEY

INVENTORS
ROCCO POPPA
JOHN L. HOELLERICH

BY

J. M. Douglas

THEIR ATTORNEY

Jan. 13, 1959

R. POPPA ET AL 2,868,967

REMOTE CONTROL TUNER

Filed June 15, 1956

5 Sheets-Sheet 5

INVENTORS
ROCCO POPPA
JOHN L. HOELLERICH

BY J. W. Douglas

THEIR ATTORNEY

United States Patent Office 2,868,967

Patented Jan. 13, 1959

2,868,967

REMOTE CONTROL TUNER

Rocco Poppa, Oak Park, and John L. Hoellerich, Wilmette, Ill., assignors to Admiral Corporation, Chicago, Ill., a corporation of Delaware Application June 15, 1956, Serial No. 591,629

6 Claims. (Cl. 250—20)

This invention relates to improvements in television receivers and more particularly a semi-automatic means for tuning in the television stations either at the receiver or at a point remote from the receiver.

Although it has been proposed to provide means for semiautomatically tuning television receivers, heretofore such means have been relatively expensive, difficult to manufacture and of such a complicated nature that the normal user was incapable of adjusting the same to the receiver and this operation required the services of a specialist.

By the present invention it is possible to provide a control which may be adjusted so that the tuner will stop only at a predetermined number of desired stations, eliminating the stopping at each of the twelve channels or a channel where no station can be received, and stopping only for the channels where signals are received. Furthermore, the structure adapts itself to production where receivers can be made without the automatic means and wherein a minimum number of changes need be made for providing an automatic tuner.

A still further advantage of the invention resides in the fact that the automatic means can be installed for controlling the receiver at the receiver, or a "plug in" cable with a remote control can be optionally provided wherein the tuning function of the receiver including station selection, volume, "off-on" and fine tuning may be effected remote from the receiver within the limits of the cable.

Still other advantages of the invention as well as the invention itself will become more apparent from the following description of an embodiment thereof which description is illustrated by the accompanying drawings and forms a part of this specification.

Figures 1, 2, 3, 4:
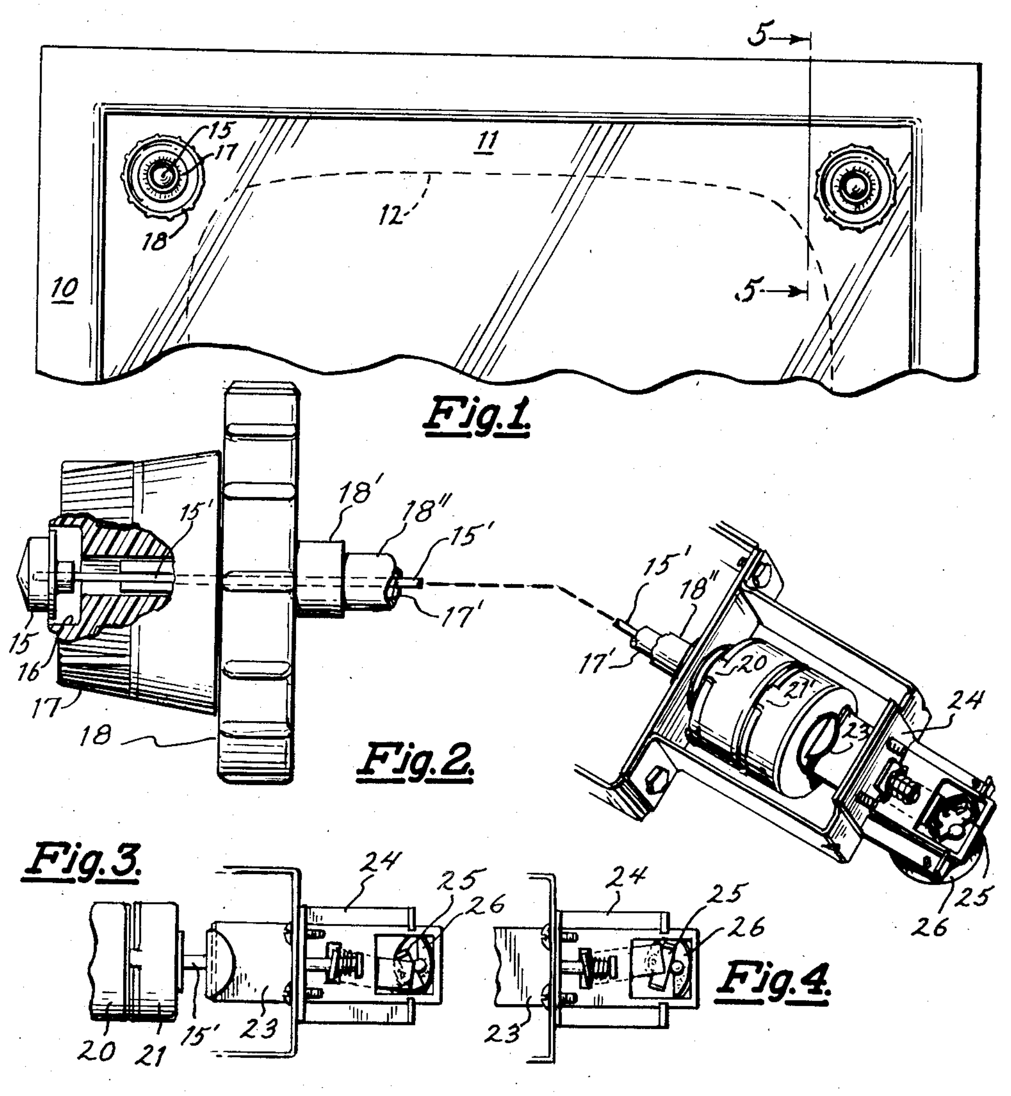
Fig. 1 is a fragmentary elevational view of the upper front portion of a television receiver showing the location of the controls.
Fig. 2 is a view partly in elevation and partly in section, with certain parts being broken away to show the inside of one of the controls for the receiver.
Figs. 3 and 4 are fragmentary plan views of a switch mechanism shown in two different operative positions.

Referring now to the drawings, throughout which like parts are designated by like reference characters, in Fig. 1 there is illustrated the upper portion 10 of a television cabinet having a glass panel 11 and behind which is a picture tube usually bordered by a mask 12. The controls usually operated by the customer are illustrated in the upper left and right hand corners and include an "off-on" button 15 which is disposed in a recess 16 in a volume control knob 17 (Fig. 2). Adjacent the glass front is a ring type knob 18 which operates a contrast control.

The buton 15 is disposed on a rod 15'. The ring 18 has a hub 18' which is secured on a hollow shaft 18'' and the knob 17 is secured on a hollow shaft 17'. The rod 15' is reciprocably journalled in the hollow shaft 17'. The shaft 17' connects to the volume control 20 and the shaft 18'' extends through the volume control and connects to the contrast control 21. The rod 15' extends through both controls and engages an operating slide 23 which is slideably journalled in a bracket 24 and operates the control member 25 of the "off-on" switch 26. The specific construction of the switch is not a part of the present invention and other types of switch could be used that could be operated by the rod 15'.

Figure 5:
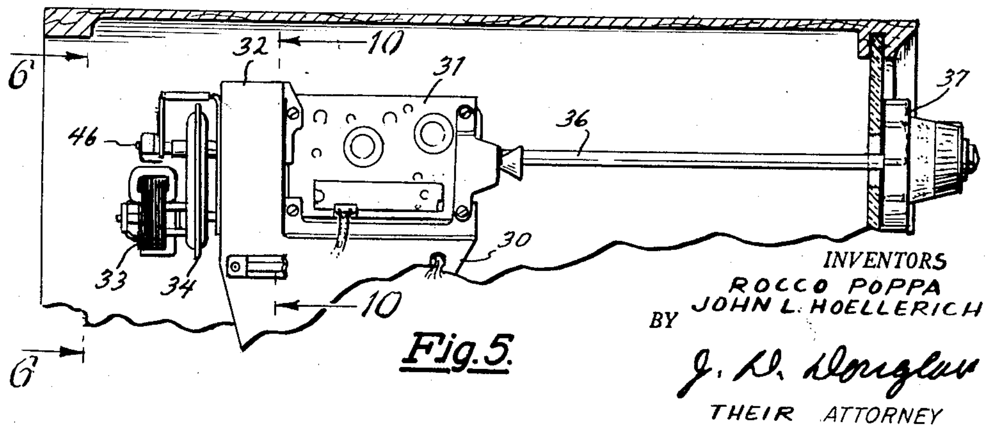
Fig. 5 is a fragmentary section taken on the line 5—5 of Fig. 1.
Figures 6, 7, 8, 9:
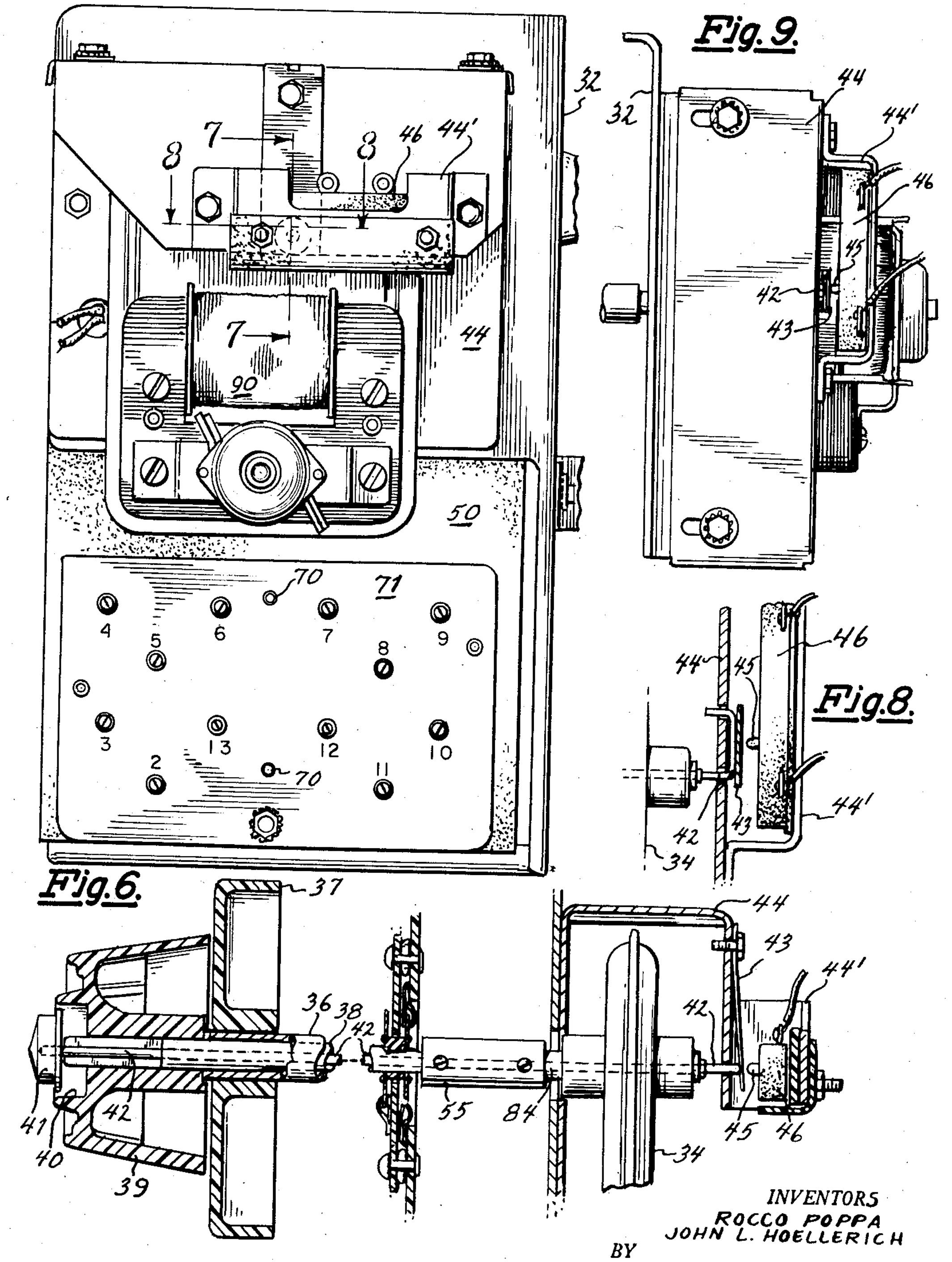
Fig. 6 is a rear elevational view of the tuner control.
Fig. 7 is a fragmentary section taken on the line 7—7 of Fig. 6.
Fig. 8 is a section taken on the line 8—8 of Fig. 6.
Fig. 9 is a fragmentary top plan view of the motor and its support.

As can be seen in Figs. 5 and 7, the television chassis is provided with a bracket 30 which supports a tuner 31. The bracket has a base 32 that carries an electric motor 33 and a reduction gearing or transmission disposed in a housing 34.

Extending from the end of the tuner 31 is a hollow sleeve or shaft 36 which projects through an opening in the window 11 and has a ring type knob 37 secured on the end. This knob and shaft enables the fine tuning control of the tuner to be operated in a manner well known in the art. The tuner is also provided with an inner sleeve 38 rotatably disposed in the sleeve 36 which is connected to and operates the usual turret type drum. It will be appreciated that the tuner could also be of the type where the tuning elements are carried by the usual stators and is not limited to any particular type of tuner. The sleeve 38 carries a knob 39 coaxial with the ring knob 37 and secured thereto whereby the turret may be rotated by hand should it be desired.

The knob 39 has an axial recess 40 in its end. A push button 41 is disposed on a shaft 42 which extends through the inner sleeve 38, through the transmission 34 and engages a spring 43 secured to a bracket 44. The push button may be pushed into the recess and moves the rod longitudinally to move the spring 43 which actuates the operating pin 45 of a normally open motor switch 46 carried on the sub-bracket 44'.

The push button 41 enables the motor switch 46 to be closed to complete a circuit for energizing the motor 33 which operates the transmission 34 to cause the rotation of the tuner shaft 38. Should the tuner 31 be of the turret type, a drum is rotated, in a manner well known in the art, to different positions enabling the tuning in of any one of the television stations depending upon the position at which the drum is stopped. The turret type tuners may be of the character such as shown in De Cola et al. application Serial No. 483,576.

The base 32, which is disposed at the rear of the tuner 31 carries a circuit board on one side toward the tuner and a motor and transmission on the side away from the tuner.

Figure 10:
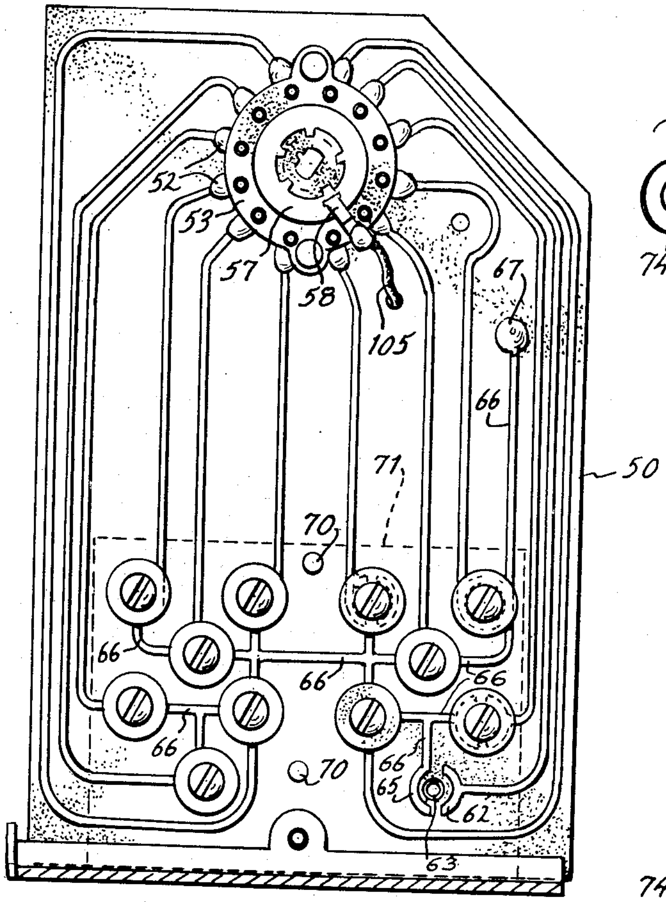
Fig. 10 is an elevational view of the conductor side of the motor control circuit board.
Figure 12:
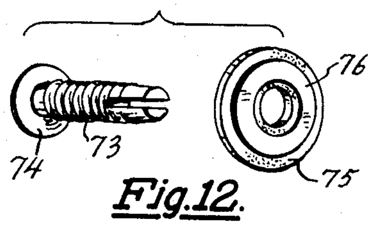
Fig. 12 is an exploded view of a switch closing assembly removed from the board.
Figure 14:
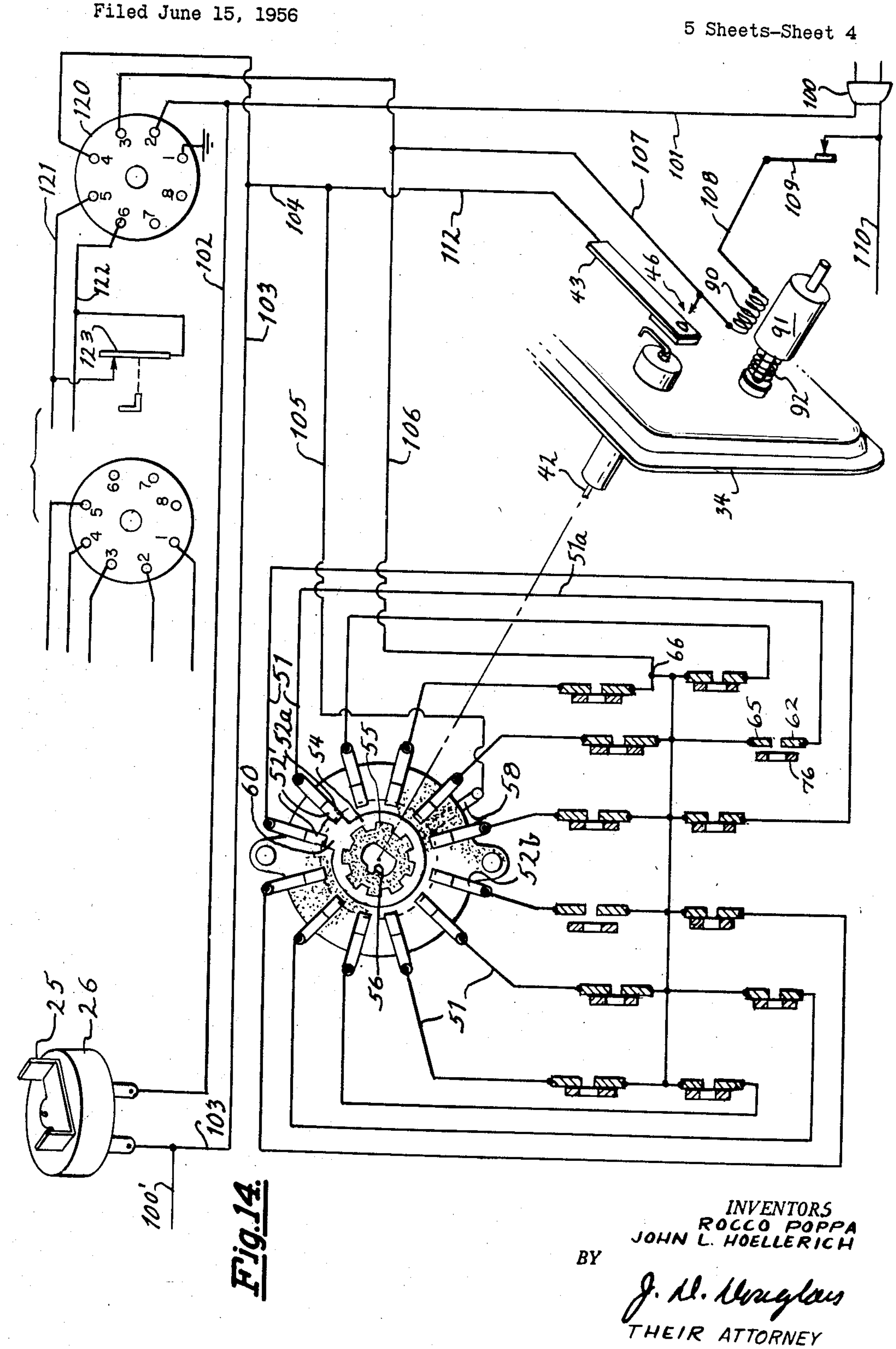
Fig. 14 is a schematic view of the circuitry used in conjunction with the automatic control.

The circuit board 50 is provided with a plurality of conductors 51, as best illustrated in Fig. 10, which converge at their upper ends in circularly displaced arrangement adapted to be soldered to the lugs 52 of the stationary support or stator 53 of a rotary switch. The switch may be of any of the types well known in the art including a rotary contactor 54 (Fig. 14) having a fiber drive portion 55, the center of which is provided with a rectangular opening 56 for engagement with a squared shaft, which in this instance is the shaft 38 that operates the drum in the tuner. The side opposite the contactor 54 is provided with a contacting ring 57 which is slidably engaged by a stationary contact 58 and provides a continuous connection with that contact. The contactor 54 is provided with a spade shaped end 60 on the other side which enables it to be selectively engaged with the fixed contacts 52' (Fig. 14). Thus the contact 58 may be selectively connected with any one of the conductors 51. The spade end 60 is sufficiently narrow that when it is centered with one of the contacts 52' it does not make contact with the adjacent contacts. It is, however, wide enough so that when it is moved slightly from its center position, it engages with the next adjacent contact depending upon the direction in which it is moved. The conductors 51 each extend downward to the lower portion of the board and each of them terminates in a semi-circular portion 62 partially surrounding an opening 63 in the board.

In the drawing, there are twelve such conductors illustrated, each extending from the switch to the lower portion of the board, and each being disposed substantially as shown, the specific arrangement being merely a matter of convenience. On the opposite side of each opening, there is provided a smaller semi-circular conductor portion 65 and each of these conductor portions is connected to a common conductor 66 which leads to a terminal 67. It will be noted that the semi-circular portions surrounding the holes are disposed in a generally rectangular pattern. On the opposite side of the board and secured thereto by screws or rivets 70 is a rectangular metal plate 71 having openings 72 centered relative to the hole 63 and slightly smaller in diameter. Each of these openings is arranged to receive the stem 73 of a screw which may be of the self-tapping variety. Each screw carries a head 74 and adjacent the head there is provided an insulated washer like member 75 which has secured thereon a metallic ring 76. The ring 76 has an inner opening large enough to provide ample clearance so that it does not contact the screw, the diameter of which is smaller than that of the washer. When the screw is threaded inward, the metallic portion 76 contacts with the portion 62 and 65 completing a circuit therebetween. When screwed outwardly to the position shown in Fig. 13, the circuit between the two elements 62 and 65 is open.

Preferably the board is made by any of the well known printed circuit processes although it will be appreciated that it could be a wired board without departing from the scope of the invention. Likewise the fixed contacts 52' could be printed circuit contacts if desired.

It will thus be seen that a circuit may be made from a wire 105 to the rotary portion of the switch and through the rotor to any one of the contacts 52' and thence through the leads 51 in the switches 62, 65, 76 to the common lead 66 and the terminal 67.

The circuit board is supported on the base 32 with the conductors and screw heads 74 facing toward the tuner 31. The tuner shaft 38 is provided with a squared portion which is aligned with and extends through the opening 56 on the switch rotor. (See Fig. 7.)

The base 32 carries a bracket 44 that supports the motor 33 which is provided with a transmission 34 that constitutes a reduction gearing, the power output being taken from a shaft 84 coupled to the shaft 38 by a coupling 85. Thus when the motor is energized, power drive from the motor through the transmission 34 to the shaft 84 drives the tuner shaft 38 and hence the drum or swtich mechanism.

As previously stated, the rod 42 operated by the push button 41 extends through the tuner shaft and motor transmission and is arranged to operate the motor switch 46. Preferably the motor is of a well known type which, when the field 90 is energized, causes the armature 91 (Fig. 14) to move longitudinally against the pressure of a spring 92 to cause a drive gear to mesh with one of the gears in the train of the transmission. When the motor is de-energized the spring forces the armature outward disconnecting the motor from the gear train, which is desirable when the tuner is manually controlled by turing the knob 39.

From the foregoing it can be understood that if the rotary switch and the adjustable switches are interposed between the source of power and the motor that should circuit be energized and all of the switches 62–65 are closed, the motor would operate continuously as long as the circuit was energized. Should the circuit be energized momentarily, and, one of the switches 62–65 be open, the motor would operate until the member 60 of the rotor arrived opposite to the contact 52' which was connected by a lead 51 to the particular switch 62–65 which was open. Upon arriving at that position, since the switch 62–65 is open, the circuit would be broken and the motor would stop. Each one of the switches 62–65 is representative of a particular channel being any one of the channels 2–13 inclusive. Should it be desired to have the device set up to operate on channels 3, 5 and 8 it would merely be necessary to back off each of the screws 74 for those particular channels, which as can be seen in Fig. 6 are indicated by the number on the metal plate 71, and the motor will operate to move the tuner through the unused channels and stop at the channels that are desired.

Figure 13:
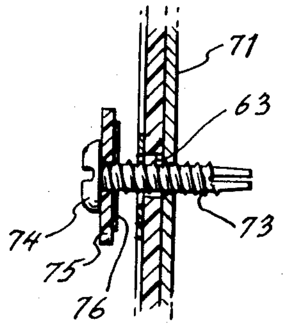
Fig. 13 is a fragmentary section through one of the switch controllers.
Figure 11:
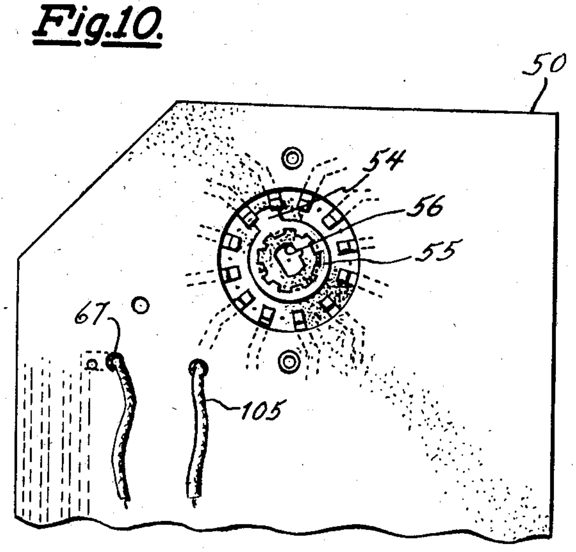
Fig. 11 is a fragmentary view of the upper end of the other side.

One side of the line 100 connects by a line 101 to a line 102 which is connected to the switch 26. The switch 26 is the main "off-on" switch for energizing the television receiver as well as the automatic control. From the switch 26, a line 100' goes to the usual television receiver power supply and a line 103, also from the switch connects to a line 104 which in turn connects to a line 105 that is attached to the terminal 58 on the rotary switch. Following the circuit, the terminal 58 connects to the ring 54 and to the spade end 60 which, depending upon the position of the rotor may be connected to any one of the contacts 52'. From the contacts 52', the circuit is through the contacts 62–65 to the line 66 which is connected to a line 106 and in turn by a line 107 to the motor field 90. The other side of the motor field 90 is connected by a line 108 and a switch 109 to the line 110 and returns to the other side of the main line 100. It is apparent that with the circuit so far described, should the switch 26 be turned on, the motor will immediately start operating and turn the rotor 54 which will continue rotating until it reaches (Fig. 14) the contact **52*a*. The motor will start turning and move until the switch blade 60 is in contact with the contact 52*a* at which time it is out of contact with the adjacent contacts and the line 51*a* which extends down to the contact 62–65 is open circuited because the contact ring 76** is in an outward position as shown in Fig. 13. The motor, therefore, stops, this being a position where the tuner would be located at a channel upon which a television signal could be received.

Should it be desired to switch to another channel, the operator merely pushes the button 41 which operates the rod 42 to close the switch 46 shown diagrammatically in Fig. 14. It will be noted that one side of this switch is connected to the line 107 and the other side is connected by a lead 112 to the line 104. Therefore although, as described, the switch 62–65 is open, the circuit is closed by the switch 46, which is in shunt with the fixed circuit board, to start the motor. The operator immediately releases pressure on the button 41 which opens the switch 46. However, the switch blade 60 has now moved to the next adjacent contact, it being wide enough to bridge the gap between two consecutive contacts, and, since that contact through the adjustable switches which are closed is connected to the line 66, the motor continues operating and will remain operating until it reaches the contact 52*b*. As is apparent, the operating member 76 in this instance is out of contact with the contact 65 and 62; therefore, the motor circuit is broken and the tuner comes to rest at this other station.

The switch 109 is a switch which may be operated to open the circuit to the field 90 of the motor, this being desirable when it is desired to operate the tuner by hand by rotating the knob 39. It is apparent that if this switch were closed that even though the rotor 54 of the switch was in an open circuited position, if it were moved it would connect with the next contact which would cause closing of the circuit and energization of the motor. This would take the control away from the operator in the absence of the switch 109.

As previously stated, the apparatus adapts itself to a remote control. Such a control is shown diagrammatically in Fig. 15. A female socket 120 (Fig. 14) of the so-called octal type is provided and is secured to the chassis. It has eight terminals for the reception of the male terminals of a plug. Terminal No. 1 is grounded. Terminal No. 2 connects by the line 101 to the line 100. Terminal No. 3 connects to the line 106–107 and terminal No. 4 connects to the line 103 which in turn connects to the "on-off" switch 26. Terminals 5 and 6 have leads 121 and 122 respectively which are adapted to be closed by a switch 123 when the remote control is not in use and open when the remote control is in use. The leads from the wires 121 and 122 extend to the television set and connect into the circuit in such a manner that when a proper rheostat, which is in the remote control, is connected into the leads and ground 1 and the switch open, the volume may be controlled. When the remote control is disconnected and the switch closed, the volume of the receiver is controlled from another point on the receiver.

Figure 16:
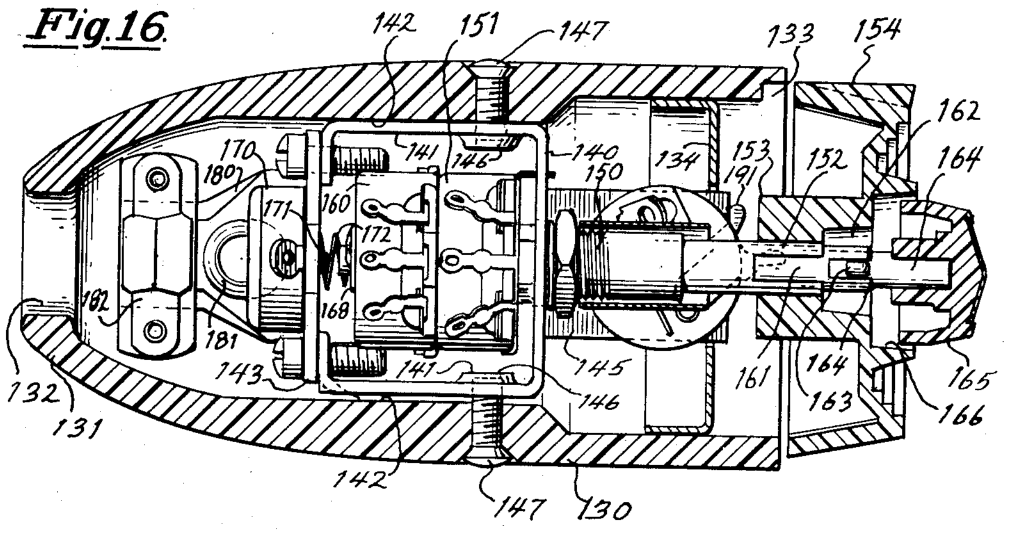
Fig. 16 is a vertical medial section through a remote control unit.
Figures 15, 17, 18:
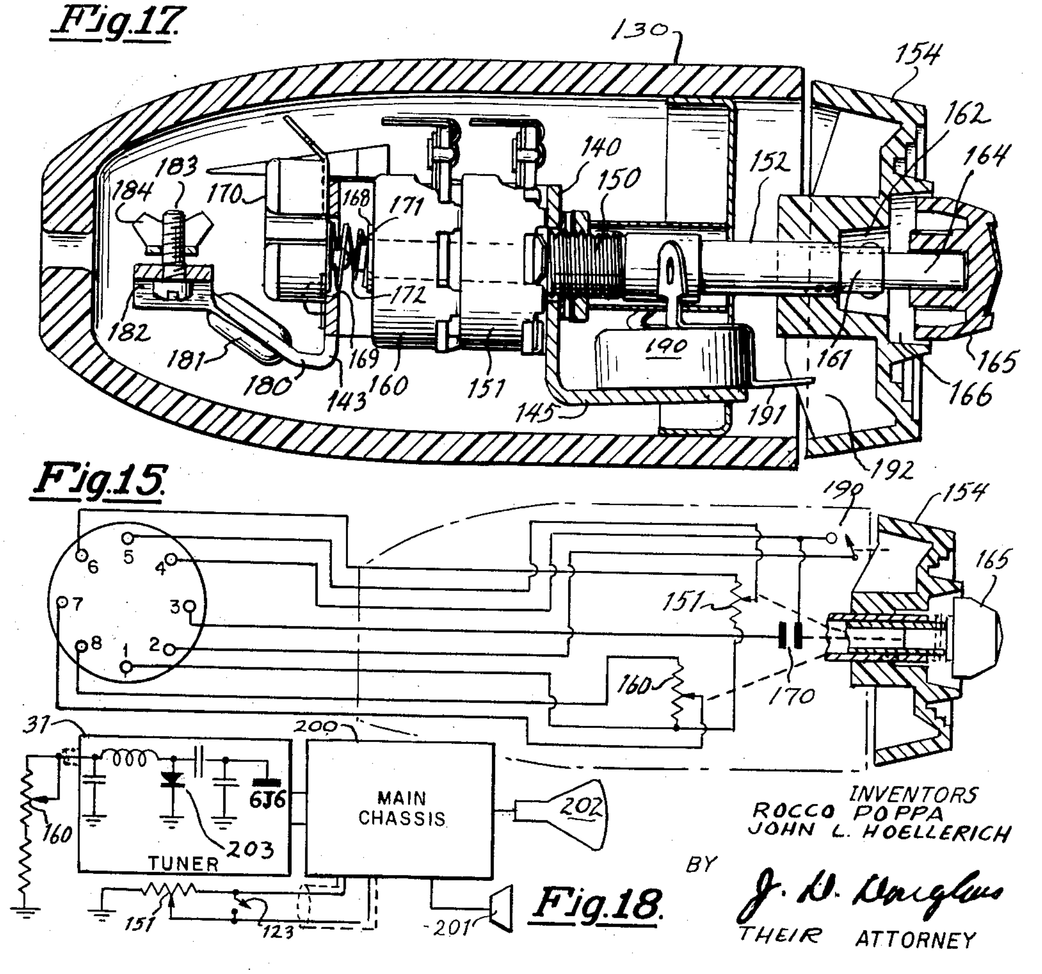
Fig. 15 is a schematic view of a remote control unit.
Fig. 17 is a similar view taken at right angles thereto.
Fig. 18 is a diagrammatic view of a television receiver illustrating an example of a fine tuning and volume control.

The remote control unit, as shown in detail in Figs. 15–17 includes a housing 130, preferably formed of a material that is electrically non-conducting and is generally circular in cross section and of elongated shape. One end of the housing tapers down at 131 and is provided with an opening 132 through which a cable may extend for connecting to the internal parts. The other end of the housing, which at that point is substantially cylindrical, is open as indicated at 133. In the embodiment shown, there is provided on "on-off" switch corresponding to the switch 26, a pair of tandem rheostats for controlling the volume and the fine tuning and a motor switch for operating the motor. It will be appreciated that certain of these controls could be eliminated and the control simplified in the interests of economy should it be desired. The supports for these components include a cup shaped front support 134 having a side wall which has a press fit with the interior of the housing.

The operating components are all supported on a bracket including a base 140 having a pair of legs 141 extending from the base on opposite sides and opposite to flattened surfaces 142 on the interior of the casing. The end of the bracket is closed by a strap 143 secured to lugs on the end of legs 141 to thus provide a substantially rectangular framework. The base of the bracket is also provided with a tongue 145 extending from an edge in the opposite direction to the legs 141. The legs are each punched and upset at 146 to provide bosses which are threaded and receive screws 147 extending through the exterior of the casing and into the threaded openings to securely hold the bracket in place. Preferably one of the legs 141 is designed to rest against the flat on the inside of the casing which assures that the parts will always be lined up in the proper axial alignment.

The base 140 is provided with an aperture which receives the threaded stem 150 of the volume control 151, that is held therein by the usual lock nut and washer. The operating stem 152 is connected to the hub 153 of the knob 154. The knob 154 is provided with a peripheral skirt, the edges of which line up with the open edge of the housing in very close proximity thereto. The hub may abut the face of the cup 134 which thus keeps the skirt of the knob from engaging with the edge of the housing.

In tandem with the volume control 151 is a second control 160 that is a fine tuning control rheostat and which is secured as the first control in a manner well known in the art. The stem 161 of this control extends through the stem of the volume control into a recess 162 coaxial with the hub. The stem is diametrically slotted and receives a pair of lugs 163 carried on a rod 164 which has a button 165 on the end. The button extends into the larger recess 166 in the knob 154. The rod extends through the stems in both rheostats and projects through the rear rheostat being held against removal by a C-ring 168. The strap 143 on the end of the bracket is provided with a central opening 169 opposite the end of the rod and a motor switch 170 is secured to the strap with the operating pin 171 disposed opposite the end of the rod 164. A spring 172 has its base seated in the recess 169 about the operating pin and against the switch and the other end engaged with the C-washer 168, urging the rod in an outward direction.

The strap 143 also supports a bracket 180 which carries a grommet 181, through which a multi-wire cable may be trained, and has a lug 182 on the end in which a screw 183 is disposed having a thumb nut 184, this being a strain relief means to which the cable may be attached.

The tongue 145 supports the "on-off" switch 190. The operating pin 191 of the "on-off" switch extends through an opening in the cup 134 and is arranged to be engaged by a web 192 extending from the rim of the knob 154 to the hub. When the knob 154 is rotated, the "on-off" switch is first turned on and then the volume control is operated. When the button 165 is rotated, lugs 163 on the shaft 164 engage the slots in the stem 161 and operate the fine tuning control 160. When the button 165 is pressed inward, the rod 164 operates the operating pin 171 on the motor switch 170.

The parts just described are shown diagrammatically in Fig. 15. It will be noted that the fine tuning control 160 has one end connected to the terminal 1 of the plug which is grounded. The other end connects to the terminal 8 and the slider to terminal 7. The volume control 151 has one end connected to the terminal 6 and the other end to terminal 1 while the slider connects to terminal 5. The motor switch 170 has one side connected to the terminal 3 and the other one to terminal 4. The "off-on" switch 190 is connected to terminals 4 and 2. It will be noted that the motor switch is in parallel with the permanent motor switch 46 and that the "off-on" switch is in parallel with the manual "off-on" switch 26.

The fine tuning control and the volume control operate in a manner well known in the art, as is illustrated in Fig. 18. In this instance, the television receiver is depicted as including a tuner 31, a main chassis 200, a picture tube 202 and a loud speaker 201. In this instance, a local oscillator tube 6J6 in the tuner, is provided with a fine tuning control which includes the rectifier 203, and which is controlled remotely by the fine tuning control 160. The volume control, likewise, is remotely controlled by the rheostat 151, which when not in use is shorted by the switch 123, these controls being in addition to the local controls on the receiver.

It will thus be apparent that there has been provided a control which may be economically manufactured, and which will allow the customer to control the receiver automatically, either at the receiver or at a point remote therefrom and which is extremely simple to adjust for the selection of certain predetermined stations.

It is also apparent that it is only necessary to push the motor start button and the motor will drive the selector until a channel which is in use is tuned in. Furthermore, with this arrangement the selector at the receiver may be moved to any station without the motor taking over the control when the receiver is adjusted for manual operation.

I claim:

1. A control for a receiver or the like including a support, a control member carried by the support and having an operating portion extending outwardly of the support, a control knob having a hub rotatably journalled on the support and provided with a rim for manual engagement by the fingers, and a web extending from the hub to the rim arranged to engage the operating portion of the control member when the knob is rotated.

2. A remote control comprising a substantially tubular casing at least one end of which is open, a support member disposed in the open end of said casing and extending inwardly of the casing, a pair of coaxially aligned juxtaposed controls disposed on the inward end of said support member, a control sleeve for the first control member extending through the open end of the casing, a second control sleeve for the second control member disposed in the first control sleeve and connected to the second control member and extending outwardly beyond the first control sleeve, a switch means disposed rearwardly of the second control member and a rod journalled in the second control sleeve and extending into operating engagement with the switch at one end and beyond the second control sleeve at the other end, a ring member having a peripheral flange extending juxtaposed to the end of the casing and provided with a hub connected to the first control sleeve and having radially extending webs extending from the hub to the flange, a knob secured to said rod for moving the rod longitudinally to close said switch, said second control sleeve being formed with a pair of longitudinally extending slots and said rod having a pin disposed in said slots, said support means supporting a second switch alongside said first sleeve, the switch having an operating member extending toward the open end of said casing in the path of travel of said webs and arranged to be engaged by said webs to operate the switch.

3. A circuit controlling means for controlling the rotation of a member where said member is driven by an electric motor operated transmission, said member having a shaft, comprising a switch board having a rotary switch thereon comprising a rotary contact and a plurality of fixed contacts with the rotary contactor arranged to swing between the fixed contacts and having a width which enables it to close two adjacent contacts at one time and arranged to engage one contact only when centered with one contact, said switch being supported by a printed circuit board having conductors on one side, one of each of which is connected to a fixed contact, said rotary member being in mechanical engagement with said rotary contact member, said printed circuit conductors being arranged with discontinuities therein, a metal plate secured to said board on the side opposite said printed circuit and said board and plate being provided with openings which are disposed between said discontinuities, screw means threaded in said metal plate and having a stem extending through said openings and a head on the side adjacent the conductors, an insulated member carried by each of the screws adjacent the head and having conductor means on the side opposite the conductors on the board and arranged to selectively close the discontinuity in the board, a source of electrical energy having one side connected to said discontinuities, the other sides of said conductors being connected to each of said fixed contacts and said rotary contact being connected to one side of the motor and the other side of the motor being connected to the line, and separate switch means connected to the line and to the motor in shunt with the rotary switch and the board for momentarily engaging the motor.

4. A control for a television receiver wherein said receiver includes a chassis and a television tuner having a tuning means operated by a rotary shaft which enables any one of a plurality of stations to be selected upon rotation of the shaft and supported by the chassis, said chassis having a circuitry whereby the sound volume may be controlled by a suitable rheostat and switch means is provided for energizing and de-energizing the receiver, said receiver having means for supporting the various components comprising a base supported by said chassis at the end of said tuner, switch and circuit means supported by said base and including a circuit board having a rotary switch including fixed contacts and a rotor having a rotary contact for selective engagement with the fixed contacts and connected to said tuner shaft, said circuit board having a plurality of conductors thereon, an end of each of which is connected to said stationary contacts, said conductors extending to a position spaced from the stationary contacts and each terminating in a portion adjacent an opening formed in said board, a common conductor disposed on said board and having branched portions terminating in portions spaced from said first portions at the said openings, a metal plate secured to said board on the opposite side from said conductors and formed with threaded openings opposite to the openings in the board, a plurality of screws threaded in said openings in the metal plate and each having a stem portion extending through the corresponding opening in the board with a head on the end, an insulated plate carried by each screw adjacent the head and movable with the screw into and out of engagement with the board, each said plate carrying conductor means spaced from the screw arranged to contact the opposed end portions of said conductors to enable selective connection of said conductors from the stationary contacts to the common conductor and constituting adjustable switch means, a motor driven transmission connected to said tuner shaft and including an electric motor for driving the same, a source of electric power for operating the television receiver and for energizing the motor, connections from said source of power and the motor to said rotary contact of the rotary switch and said common conductor for energizing the motor from said source of power through the rotary switch and the respective adjustable switch means, a motor start switch connected between said rotary contact of the rotary switch and said common conductor and normally in an open position, and means for temporarily closing said motor switch to energize the motor from said source of power independent of the rotary switch and said adjustable switch means, the rotary contact on said rotary switch being of such a size that when a station has been selected the rotary contact is only in contact with one of said stationary contacts and being arranged upon movement to make contact with two adjacent stationary contacts, each said adjustable switch means when opened being arranged to open the circuit from said source of power through the rotary switch to the motor when the rotary contact is in contact with only the corresponding stationary contact, a second swich and control means including a casing having a motor energizing switch therein connected in shunt with said motor start switch, and a volume control means included in said casing, a switch in said casing connected in shunt with said switch means for energizing and de-energizing the receiver, said last mentioned switches being connected to a cable having conductors connected to said switches and volume control and also connected at the other end to said chassis to enable the television receiver to be controlled from a remote point.

5. A motor driven operating mechanism for driving the selector means on a television tuner wherein said tuner has a rotary shaft which is rotated to different positions to enable any one of a plurality of television stations to be selected comprising a switch means connected to and operable by said rotary shaft, a motor coupled to said shaft, a source of electrical current for operating said motor, circuit connections between said current source and said motor which include said switch means, said switch means being arranged to selectively open the motor circuit when said tuner shaft arrives at a position for any predetermined television station, and shunt switch means connected to said current source in parallel with said first switch means to energize and start said motor independent of said first switch means and independent of the rotational position of said shaft after the motor has been stopped by said first switch means, said first switch means being independent of said shunt switch means so that operation of said shunt switch means does not affect the setting of said first switch means, said shunt switch means being provided with an operating means in alignment with said tuner shaft, said tuner shaft being hollow, and a rod extending through said shaft and operable from the end of the shaft to close said shunt switch means.

6. A mechanism as recited in claim 5 wherein said tuner shaft has a control knob thereon having a central recess, and a push button is disposed on said rod and is movable in said recess to operate the rod.

References Cited in the file of this patent

UNITED STATES PATENTS

| | | |
|---|---|---|
| 1,572,645 | Francesco | Feb. 9, 1926 |
| 1,885,147 | Smith | Nov. 1, 1932 |
| 1,992,327 | Powell | Feb. 26, 1935 |
| 2,020,000 | Schellenger | Nov. 5, 1935 |
| 2,066,511 | Arlt | Jan. 5, 1937 |
| 2,186,828 | Forstrom | Jan. 9, 1940 |
| 2,288,005 | Lehmann | June 30, 1942 |
| 2,362,690 | Fichter | Nov. 14, 1944 |
| 2,501,003 | Pifer | Mar. 21, 1950 |
| 2,566,278 | Williams | Aug. 28, 1951 |
| 2,602,731 | Nierenberg | July 8, 1952 |
| 2,616,994 | Luhn | Nov. 4, 1952 |
| 2,650,270 | Mucher | Aug. 25, 1953 |
| 2,742,599 | Schweighofer | Apr. 17, 1956 |
| 2,744,193 | Schwarz | May 1, 1956 |
| 2,783,429 | Tauber | Feb. 26, 1957 |